(12) United States Patent
Casey et al.

(10) Patent No.: US 9,794,361 B2
(45) Date of Patent: *Oct. 17, 2017

(54) NETWORK USER USAGE PROFILING

(71) Applicant: CenturyLink Intellectual Property LLC, Denver, CO (US)

(72) Inventors: Steven M. Casey, Littleton, CO (US); Amie Elcan, Superior, CO (US); John Butala, Shoreview, MN (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/461,082

(22) Filed: Mar. 16, 2017

(65) Prior Publication Data
US 2017/0187816 A1 Jun. 29, 2017

Related U.S. Application Data

(63) Continuation of application No. 15/056,824, filed on Feb. 29, 2016, now Pat. No. 9,635,117, which is a
(Continued)

(51) Int. Cl.
*H04L 29/06* (2006.01)
*H04L 29/08* (2006.01)
*H04L 12/26* (2006.01)

(52) U.S. Cl.
CPC .......... *H04L 67/22* (2013.01); *H04L 43/0876* (2013.01); *H04L 67/306* (2013.01)

(58) Field of Classification Search
CPC ... H04L 43/0876; H04L 67/303; H04L 67/22; H04L 41/5035; H04L 43/106; H04L 41/507
(Continued)

(56) References Cited

U.S. PATENT DOCUMENTS 6,801,940 B1 10/2004 Moran et al.
6,826,472 B1 11/2004 Kamei et al.
(Continued)

OTHER PUBLICATIONS

U.S. Appl. No. 12/342,974, Notice of Publication dated Jun. 24, 2010, 1 page.
(Continued)

*Primary Examiner* — Mahfuzur Rahman
(74) *Attorney, Agent, or Firm* — Swanson & Bratschun, L.L.C.

(57) ABSTRACT

Methods, systems, devices, and software are disclosed for generating a network usage profile. Certain embodiments of the network usage profile include a devices-by-node profile, indicating the set of customer devices available for use in communicating with a customer-side network node located at a customer side of an access network over a period of time, where some of the customer devices are not in operative communication with the customer-side network node during a portion of that time. Other embodiments associate the network usage profile with customer information to generate device-by-customer profiles. Still other embodiments associate the network usage profile with network traffic information to generate traffic-by-device profiles. Even other embodiments associate the multiple sources and types of information to generate traffic-by-customer profiles and/or traffic-by-device-by-customer profiles. Any of the profiles may then be accessed by one or more parties for use in affecting various network services, including targeting content delivery.

18 Claims, 6 Drawing Sheets

Related U.S. Application Data continuation of application No. 14/847,638, filed on Sep. 8, 2015, now Pat. No. 9,300,550, which is a continuation of application No. 14/282,162, filed on May 20, 2014, now Pat. No. 9,160,642, which is a continuation of application No. 13/473,410, filed on May 16, 2012, now Pat. No. 8,769,617, which is a continuation of application No. 12/342,789, filed on Dec. 23, 2008, now Pat. No. 8,201,220.

(58) Field of Classification Search
USPC .......................................................... 726/4
See application file for complete search history.

(56) References Cited

U.S. PATENT DOCUMENTS

| | | |
|---|---|---|
| 7,046,680 B1 | 5/2006 | McDysan et al. |
| 7,100,195 B1 | 8/2006 | Underwood |
| 7,420,976 B2 | 9/2008 | Lin |
| 7,567,846 B2 | 7/2009 | Sztybel |
| 7,580,996 B1 | 8/2009 | Allan et al. |
| 7,617,314 B1 | 11/2009 | Bansod et al. |
| 7,630,986 B1 | 12/2009 | Herz et al. |
| 7,633,944 B1 | 12/2009 | Chang et al. |
| 7,685,577 B2 | 3/2010 | Pace et al. |
| 7,849,408 B1 | 12/2010 | Messinger et al. |
| 7,865,908 B2 | 1/2011 | Garg et al. |
| 7,886,033 B2 | 2/2011 | Hopmann et al. |
| 7,916,635 B2 | 3/2011 | Casey et al. |
| 7,933,228 B2 | 4/2011 | Coley |
| 8,004,491 B2 | 8/2011 | Maynard et al. |
| 8,103,755 B2 | 1/2012 | Malan et al. |
| 8,112,511 B2 | 2/2012 | Sim et al. |
| 8,201,220 B2 | 6/2012 | Casey et al. |
| 8,208,375 B2 | 6/2012 | Bharadwaj et al. |
| 8,281,390 B1 | 10/2012 | Shah et al. |
| 8,291,405 B2 | 10/2012 | Buckley et al. |
| 8,310,923 B1 | 11/2012 | Nordstrom et al. |
| 8,402,540 B2 | 3/2013 | Kapoor et al. |
| 8,451,724 B2 | 5/2013 | Casey et al. |
| 8,520,603 B2 | 8/2013 | Kozisek et al. |
| 8,705,356 B2 | 4/2014 | Casey et al. |
| 8,769,617 B2 | 7/2014 | Casey et al. |
| 9,160,642 B2 | 10/2015 | Casey et al. |
| 9,300,550 B2 | 3/2016 | Casey et al. |
| 9,635,117 B2 | 4/2017 | Casey et al. |
| 2004/0158618 A1 | 8/2004 | Shaw |
| 2006/0239254 A1 | 10/2006 | Short et al. |
| 2007/0070969 A1* | 3/2007 | Malomsoky .......... H04W 24/08 370/345 |
| 2007/0226775 A1 | 9/2007 | Andreasen et al. |
| 2008/0162714 A1 | 7/2008 | Pettersson |
| 2008/0279097 A1 | 11/2008 | Campion et al. |
| 2009/0089419 A1 | 4/2009 | Saha et al. |
| 2009/0092139 A1 | 4/2009 | Coley |
| 2009/0296702 A1 | 12/2009 | Stevens et al. |
| 2010/0005171 A1 | 1/2010 | Arolovitch |
| 2010/0091676 A1 | 4/2010 | Moran et al. |
| 2010/0157802 A1 | 6/2010 | Casey et al. |
| 2010/0162359 A1 | 6/2010 | Casey et al. |
| 2011/0225293 A1 | 9/2011 | Rathod |
| 2011/0276396 A1 | 11/2011 | Rathod |
| 2012/0230203 A1 | 9/2012 | Casey et al. |
| 2013/0238430 A1 | 9/2013 | Casey et al. |
| 2014/0129942 A1 | 5/2014 | Rathod |
| 2014/0258517 A1 | 9/2014 | Casey et al. |
| 2015/0381438 A1 | 12/2015 | Casey et al. |
| 2016/0182662 A1 | 6/2016 | Casey et al. |

OTHER PUBLICATIONS

U.S. Appl. No. 12/342,789, Notice of Publication dated Jun. 24, 2010, 1 page.
U.S. Appl. No. 12/342,974; Non-Final Rejection dated Aug. 4, 2010; 12 pages.
U.S. Appl. No. 12/342,974; Notice of Allowance dated Nov. 29, 2010; 8 pages.
U.S. Appl. No. 12/342,974; Issue Notification dated Mar. 9, 2011; 1 page.
U.S. Appl. No. 12/342,789; Non Final Office Action dated Sep. 15, 2011; 43 pages.
http://www.sflow.org/sFlowOverview.pdf, Traffic Monitoring using sFlow|www.sflow.org|pp. 1-5|2003.
U.S. Appl. No. 12/342,789; Notice of Allowance dated Feb. 29, 2012; 23 pages.
U.S. Appl. No. 12/342,789; Issue Notification dated May 23, 2012; 1 page.
U.S. Appl. No. 12/967,829; Non-Final Rejection dated Nov. 2, 2012, 13 pages.
U.S. Appl. No. 12/967,829; Notice of Allowance dated Jan. 25, 2013; 18 pages.
U.S. Appl. No. 12/967,829; Issue Notification dated May 8, 2013; 1 page.
U.S. Appl. No. 13/870,197; Non-Final Rejection dated Aug. 23, 2013; 18 pages.
U.S. Appl. No. 13/870,197; Notice of Allowance dated Dec. 10, 2013; 21 pages.
A Parameterizable Methodology for Internet Traffic Flow Profiling; http://ieeexplore.ieee.org/stamp/stamp.jsp?tp=&arnumber=464717; Claffy et al.; 1995; pp. 1481-1494.
U.S. Appl. No. 13/473,410; Notice of Allowance dated Feb. 20, 2014; 45 pages.
U.S. Appl. No. 13/870,197; Issue Notification dated Apr. 2, 2014; 1 page.
U.S. Appl. No. 13/473,410; Issue Notification dated Jun. 11, 2014; 1 page.
PowerScope: A Tool for Profiling the Energy Usage of Mobile Applications; Flinn et al; 1998; pp. 1-9.
U.S. Appl. No. 14/282,162; Non-Final Rejection dated May 26, 2015; 26 pages.
Profiling and Modeling Resource Usage of Virtualized Applications; http://seelab.ucsd.edu/virtualefficiency/related_papers/wood-middleware08.pdf; Wood et al; pp. 1-20; 2008.
U.S. Appl. No. 14/282,162; Notice of Allowance dated Jun. 11, 2015; 17 pages.
U.S. Appl. No. 14/282,162; Issue Notification dated Sep. 23, 2015; 1 page.
U.S. Appl. No. 14/847,638; Notice of Allowance dated Nov. 20, 2015; 40 pages.
U.S. Appl. No. 15/056,824; Notice of Allowance dated Dec. 30, 2016; 34 pages.
U.S. Appl. No. 15/056,824; Notice of Allowability dated Jan. 20, 2017; 16 pages.

* cited by examiner

NETWORK USER USAGE PROFILING

CROSS REFERENCE TO RELATED APPLICATION

This application is a continuation of U.S. patent application Ser. No. 15/056,824 filed Feb. 29, 2016 by Steven M. Casey et al. and titled, "Network User Usage Profiling", which is a continuation of U.S. patent application Ser. No. 14/847,638 (now U.S. Pat. No. 9,300,550) filed Sep. 8, 2015 by Steven M. Casey et al. and titled, "Network User Usage Profiling", which is a continuation of U.S. patent application Ser. No. 14/282,162 (now U.S. Pat. No. 9,160,642), filed May 20, 2014 by Steven M. Casey et al. and titled, "Network User Usage Profiling", which is a continuation of U.S. patent application Ser. No. 13/473,410 (now U.S. Pat. No. 8,769,617), filed May 16, 2012 by Steven M. Casey et al. and titled, "Network User Usage Profiling", which is a continuation of U.S. patent application Ser. No. 12/342,789 (Now U.S. Pat. No. 8,201,220), filed Dec. 23, 2008 by Steven M. Casey et al. and entitled, "Network User Usage Profiling", all of which are hereby incorporated by reference in its entirety.

Embodiments of the invention are related to telecommunication services and, in particular, to the generation and/or processing of network user usage data.

BACKGROUND

In a typical network, a network service provider may facilitate the communication of data between multiple parties over the network. For example, email data, multimedia data, video game data, telephonic data, e-commerce data, and any other desired data may be communicated among users of the network. By inspecting the network traffic, much information may be learned about the network, the data traversing the network, and the parties communicating the data. This information may then be used for targeting advertising, enforcing copyrights, detecting viruses, providing tiered network services, etc.

A number of techniques are known for inspecting network traffic. For example, a network service provider may implement a deep-packet inspection ("DPI") appliance in a network router that connects the service provider's local network to multiple customers' access networks via a digital subscriber line access multiplexer ("DSLAM"). The DPI appliance may be configured to inspect the traffic traversing the access networks to look for specific data (e.g., known viruses) or patterns (e.g., web-browsing habits).

While the current network traffic inspection implementations may produce some useful results, the results may be limited by a number of factors. One factor is that it may be impractical (e.g., it may require too many computational and/or storage resources, or it may slow the network traffic to an undesirable level) to fully inspect each of the likely myriad data packets traversing the network. As such, certain data may ultimately be missed, yielding incomplete results. Another factor is that, even for network traffic that is inspected, each data packet may only contain certain types of information, like header information (e.g., source address, destination address, protocol, etc.) and payload information (e.g., content).

For at least these reasons, it may be desirable to add functionality to current network traffic inspection implementations to potentially address some of the factors limiting their value.

BRIEF SUMMARY

Among other things, embodiments of the invention include methods, systems, devices, and software for generating a network usage profile. Embodiments of the network usage profile generate a devices-by-node profile, indicating the set of customer devices available for use in communicating with a customer-side network node located at a customer side of an access network over a period of time, where some of the customer devices are not in operative communication with the customer-side network node during a portion of that time. The network usage profile may be associated with information from multiple sources and/or systems to generate device-by-customer profiles, traffic-by-device profiles, traffic-by-customer profiles, and/or traffic-by-device-by-customer profiles. The various types of profiles may then be accessed by one or more parties for use in affecting various network services, including monitoring, preventing, or targeting delivery of certain types of content.

In one set of embodiments, a method is provided for generating a network usage profile defining at least an estimation of a set of customer devices available for use in communicating with a customer-side network node located at a customer side of an access network, the set of customer devices comprising a set of active devices currently in operative communication with the customer-side network node and a set of inactive devices not currently in operative communication with the customer-side network node. The method includes: receiving device data from the set of active devices currently in operative communication with the customer-side network node; processing the device data to determine an active devices profile comprising a device type for each of the set of active devices; receiving a timestamp temporally relating to the device data received in the receiving device data step; receiving a node identifier identifying the customer-side network node; associating the timestamp and the node identifier with the active devices profile to generate a current devices-by-node record, the current devices-by-node record defining the set of active devices communicatively coupled with the customer-side network node identified by the node identifier at the time identified by the timestamp; logging the current devices-by-node record in a devices-by-node log, the devices-by-node log comprising multiple devices-by-node records generated over a time duration; and analyzing the devices-by-node log to generate a devices-by-node profile as a function of the multiple devices-by-node records generated over at least a portion of the time duration, the devices-by-node profile defining at least an estimation of the set of customer devices available for use in communicating with the customer-side network node during the at least a portion of the time duration, wherein the network usage profile comprises the devices-by-node profile.

In another set of embodiments, a network usage profile handling system is provided for use in a network comprising a plurality of customer-side network nodes, each respective customer-side network node being associated with a customer and communicatively coupled with an access network by which the customer receives access to network services provided by a network service provider, each customer being further associated with a set of customer devices available for use in communicating with the respective customer-side network node, the set of customer devices comprising a set of active devices currently in operative communication with the respective customer-side network node and a set of inactive devices not currently in operative communication with the respective customer-side network node. The system includes: a node data aggregator module adapted to generate a set of current devices-by-node records, each of the set of current devices-by-node records being associated with a respective customer-side network node and generated by receiving device data from the set of active devices currently in operative communication with the respective customer-side network node; processing the device data to determine an active devices profile comprising a device type for each of the set of active devices currently in operative communication with the respective customer-side network node; receiving a timestamp temporally relating to the device data; receiving a node identifier identifying the respective customer-side network node; and associating the timestamp and the node identifier with the active devices profile to generate a current devices-by-node record, defining the set of active devices in operative communication with the respective customer-side network node identified by the node identifier at the time identified by the timestamp. The system also includes a usage profile data store, adapted to store a devices-by-node log comprising a plurality of devices-by-node records generated over a time duration, the set of current devices-by-node records being some of the plurality of devices-by-node records; and a usage profile module, communicatively coupled with the usage profile data store and adapted to generate a network usage profile by analyzing the devices-by-node log to generate devices-by-node profiles for each of the plurality of customer-side network nodes as a function of the plurality of devices-by-node records generated over at least a portion of the time duration, the devices-by-node profiles defining at least an estimation of the set of customer devices available for use in communicating with each of the customer-side network nodes during the at least a portion of the time duration, wherein the network usage profile comprises the devices-by-node profiles.

Yet another set of embodiments provides a computational system including a computer-readable storage medium having a computer-readable program embodied therein for generating a network usage profile defining at least an estimation of a set of customer devices available for use in communicating with a customer-side network node located at a customer side of an access network, the set of customer devices comprising a set of active devices currently in operative communication with the customer-side network node and a set of inactive devices not currently in operative communication with the customer-side network node. The computer-readable program includes instructions for providing the controlled access to the network characteristic data in accordance with the following: receiving device data from the set of active devices currently in operative communication with the customer-side network node; processing the device data to determine an active devices profile comprising a device type for each of the set of active devices; receiving a timestamp temporally relating to the device data received in the receiving device data step; receiving a node identifier identifying the customer-side network node; associating the timestamp and the node identifier with the active devices profile to generate a current devices-by-node record, the current devices-by-node record defining the set of active devices communicatively coupled with the customer-side network node identified by the node identifier at the time identified by the timestamp; logging the current devices-by-node record in a devices-by-node log, the devices-by-node log comprising a plurality of devices-by-node records generated over a time duration; and analyzing the devices-by-node log to generate a devices-by-node profile as a function of the plurality of devices-by-node records generated over at least a portion of the time duration, the devices-by-node profile defining at least an estimation of the set of customer devices available for use in communicating with the customer-side network node during the at least a portion of the time duration, wherein the network usage profile comprises the devices-by-node profile.

BRIEF DESCRIPTION OF THE DRAWINGS

A further understanding of the nature and advantages of the present invention may be realized by reference to the figures, which are described in the remaining portion of the specification. In the figures, like reference numerals are used throughout several figures to refer to similar components. In some instances, a reference numeral may nave an associated sub-label consisting of a lower-case letter to denote one of multiple similar components. When reference is made to a reference numeral without specification of a sub-label, the reference is intended to refer to all such multiple similar components.

DETAILED DESCRIPTION

Among other things, embodiments of the invention generate and provide access to various types of network usage profiles. For example, various embodiments include methods, systems, devices, and software for generating devices-by-node profiles, devices-by-customer profiles, traffic-by-device profiles, traffic-by-customer profiles, and/or traffic-by-device-by-customer profiles. In some embodiments, controlled access may be provided to the generated profiles to affect various network services. For example, content delivery may be targeted to particular devices by way of particular network nodes as a function of a devices-by-node profile.

In the following description, for the purposes of explanation, numerous specific details are set forth in order to provide a thorough understanding of the present invention. It will be apparent, however, to one skilled in the art that the present invention may be practiced without some of these specific details. For example, while various features are ascribed to particular embodiments, it should be appreciated that the features described with respect to one embodiment may be incorporated with other embodiments as well. By the same token, however, no single feature or features of any described embodiment should be considered essential to the invention, as other embodiments of the invention may omit such features. Further, while various embodiments are described with reference to the Internet, embodiments of the invention may be implemented in any network.

Figure 1:
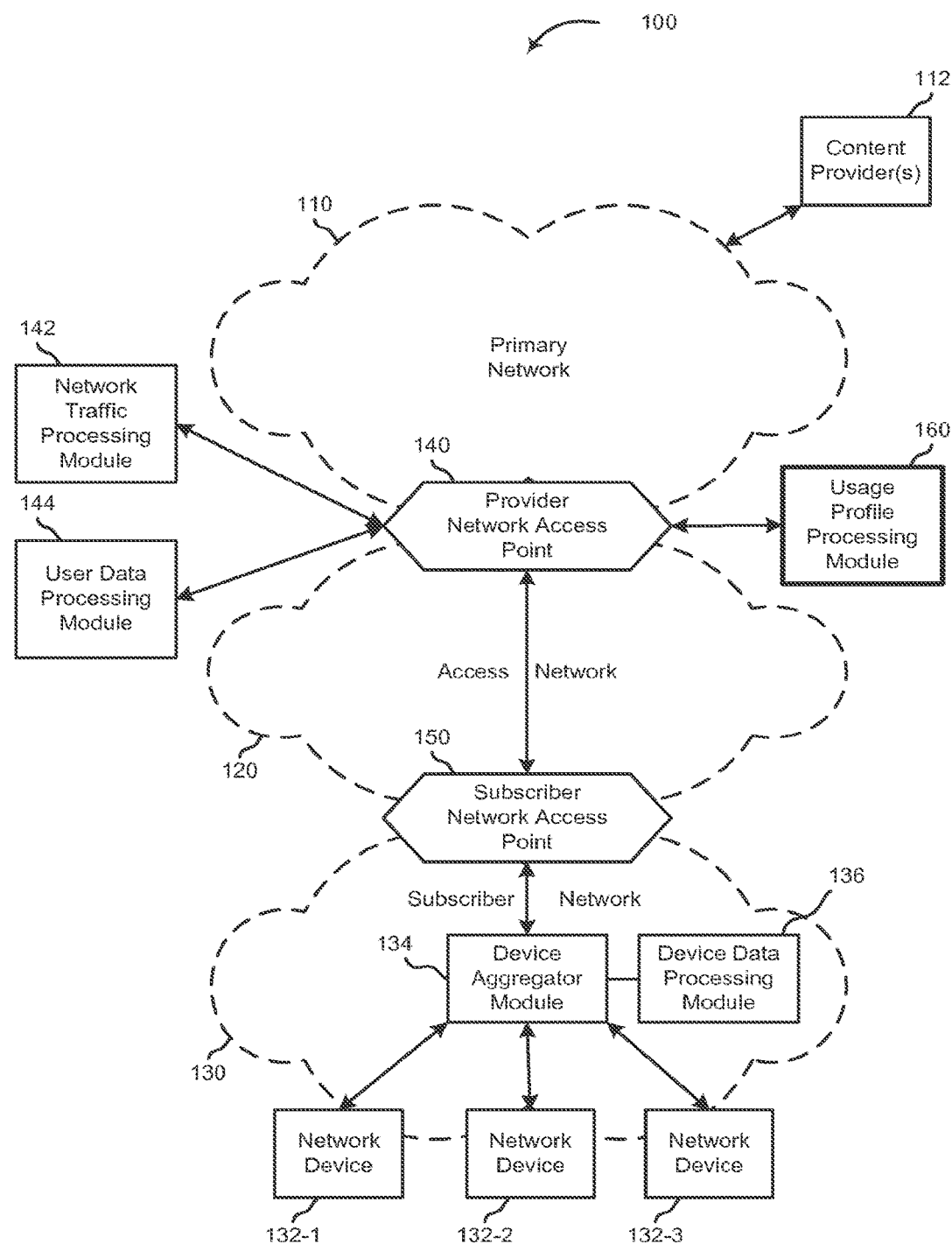
FIG. 1 shows a simplified diagram of an embodiment of a network environment that may be used according to various embodiments of the invention.

Turning first to FIG. 1, a simplified diagram is shown of an embodiment of a network environment that may be used according to various embodiments of the invention. The network environment 100 includes a primary network 110, an access network 120, and a subscriber network 130. These various networks may work together to provide a communicative coupling between content providers 112 and end user network devices 132.

In some embodiments, a customer of network services accesses the network services through one or more end user network devices 132. In certain embodiments, data from the various end user network devices 132 is aggregated by a device aggregator module 134 (e.g., a modem, router, femtocell, etc.). The device aggregator module 134 may include, or be in communication with, a subscriber network access point 150.

In certain embodiments, the end user network devices 132, the device aggregator module 134, and the subscriber network access point 150 may be considered as part of the subscriber network 130 (e.g., the subscriber's home network). The subscriber network 130 (e.g., data from the end user network devices 132 aggregated by the device aggregator module 134) may be communicatively coupled, through the subscriber network access point 150, with its respective access network 120. The access network 120 may, in turn, communicatively couple the subscriber network access point 150 with a provider network access point 140, thereby providing the subscriber network 130 with access to the primary network 110.

In some embodiments, the content providers 112 (e.g., application providers, network service providers, network end users, etc.) are in communication with the primary network 110. For example, the content providers 112 may communicate data with the primary network 110 over a network topology similar to the one used by the end user network devices 132 (e.g., including a content provider access network). It will be appreciated that many types of network topologies are possible, and that many parties (e.g., customer, content providers, service providers, etc.) may share or require network elements. For example, many customers may communicate with many content providers over the primary network 110 via a number of dedicated and/or shared access networks 120.

Embodiments of the network environment 100 are adapted to provide various types of functionality using various types of data processing (e.g., generation, storage, aggregation, etc.) modules. These modules may communicate with or be part of the network environment 100 in various ways and may be controlled by one or more of various parties. In the embodiment shown, the network environment 100 includes a device data processing module 136, a network traffic processing module 142, a user data processing module 144, and a usage profile processing module 160.

In some embodiments, the network traffic processing module 142 is adapted to generate a traffic-by-customer profile. For example, the network traffic processing module 142 processes (e.g., inspect, filter, aggregate, store, etc.) network traffic at the data packet level. It will be appreciated that types of data packet inspection are known in the art. One type of data packet inspection is called Deep Packet Inspection ("DPI"), or "Complete Packet Inspection." A DPI appliance may filter and inspect the header and/or payload portions of data packets at they cross an inspection point in a network. Another type of packet inspection may include so-called "shallow packet inspection," sometimes referred to simply as "packet inspection," which may check only header portions of data packets.

In certain embodiments, the network traffic processing module 142 is in communication with the provider network access point 140 at the provider end of the customer's access network 120. Because network traffic destined for the customer's subscriber network access point 150 passes through the provider network access point 140, the network traffic processing module 142 may use this location as an inspection point for examining customer-bound data packets. As data packets pass the inspection point, some or all of the packets may be examined for certain types of information (e.g., or stored or buffered for further processing). For example, the network traffic processing module 142 may inspect the network traffic for certain patterns (e.g., bandwidth usage, web browsing habits, etc.), for certain content (e.g., known virus or worm strings, pattern matching, etc.), etc. The traffic and/or data relating to the traffic may then be stored, further processed (sorted, filtered, mined, etc.), and/or shared with other modules (e.g., the usage profile processing module 160).

It is worth noting that the network traffic processing module 142 may be limited in certain respects. One limitation may be that, while the network traffic processing module 142 may be configured to inspect traffic traversing a particular access network 120, the network traffic processing module 142 may have little or no awareness of how the traffic is routed outside the access network (e.g., in the subscriber network 130). For example, a network service provider may desire to determine which types of devices a customer is using to communicate traffic over the network. In a typical network, however, the device-level information may be obscured.

For example, the subscriber network access point 150 may be issued a static or dynamic Internet protocol ("IP") address with which it may communicate over the access network 120. Within the subscriber network 130, however, each of the end user network devices 132 may be issued a private IP address. The device aggregator module 134 may receive data from each of the various end user network devices 132 and their respective private IP addresses, aggregate the data into access network traffic, and communicate the aggregated data with the access network 120 via the subscriber network access point 150. Typically, the access network traffic may be communicated using the static or dynamic address assigned to the subscriber network access point 150, with little awareness of the end user network device 132 with which the traffic is being ultimately communicated. As such, the network traffic processing module 142 may be unable to associate the access network traffic with any particular end user network device 132.

It will be appreciated, however, that evaluating the network traffic while it is still traceable to its respective originating or destination devices (e.g., while associated with private IPs) may allow the data to be associated with those individual end user network devices 132. Much of the value in this association, however, may be from identifying the end user network devices 132 on a user's subscriber network 130, e.g., a devices-by-user profile. In some embodiments, the device data processing module 136 is adapted to generate a devices-by-user profile.

In certain embodiments, the device data processing module 136 is in communication with (e.g., is integrated with, interfaces with, or otherwise directly or indirectly communicates with) the device aggregator module 134; while the network traffic processing module 142, the user data processing module 144, and the usage profile processing module 160 are all in communication with the subscriber network access point 150. Each module may be further in communication with some or all of the other modules either directly or indirectly.

It will be appreciated that each module may provide many different types of functionality in many different ways, and that additional modules may be provided. In some embodiments, the device data processing module 136 is adapted at least to track and aggregate data coming from the end user network devices 132. The various end user network devices 132 may include laptop computers, cell phones, personal digital assistants ("PDAs"), webcams, network printers, voice-over-Internet-protocol ("VoIP") terminals, Internet protocol television ("IPTV") terminals, and/or any other type of device or system adapted to communicate data with a network (or more specifically, with the device aggregator module 134 in the subscriber network 130).

It is worth noting that, at any given time, the set of end user network devices 132 may include both an active set of end user network devices 132, and an inactive set of end user network devices 132. The active set of end user network devices 132 may include those devices that, at the given time, are in operative communication with the device aggregator module 134. For example, the device may be currently able to communicate with the device aggregator module 134 (e.g., within range of and authorized to communicate with a WiFi router), regardless of whether any data is actually being communicated at the given time (e.g., in certain embodiments, the device may be in standby mode, and still be considered "in operative communication"). The inactive set of end user network devices 132 may include those devices that, at the given time, are not in operative communication with the device aggregator module 134. For example, the device may be configured to communicate with the device aggregator module 134 (e.g., the device has WiFi capability), but is currently not able to communicate with the device aggregator module 134 (e.g., the device is out of range). Of course, at certain times, either of the active or inactive sets of end user network devices 132 may be a null set. For example, the entire set of end user network devices 132 may be active at some point in time.

By way of example, say a customer has a home wireless router (i.e., acting as the customer's device aggregator module 134), which includes an integrated modem (i.e., acting as the customer's subscriber network access point 150) in communication with the customer's access network 120. The customer also owns a laptop with wireless networking capability, a network printer, and a cell phone that automatically connects to any authorized wireless network within range. During the day, the customer leaves the laptop and printer at home, and carries the cell phone to work. When the customer is away from the house, the laptop and printer may remain active end user network devices 132 because they remain in communication with the customer's subscriber network 130, even though each device may communicate little or no information with the device aggregator module 134 throughout the day. The cell phone, however, may alternate from being an active device to being an inactive device, depending on whether the cell phone is in communication with (e.g., in range of) the device aggregator module 134. Still, in certain embodiments, it may be desirable to consider all three devices as end user network devices 132, as all the devices are used (at times) in the customer's subscriber network 130.

As the data from the various end user network devices 132 is aggregated at the device aggregator module 134, the data may be processed by the device data processing module 136. In some embodiments, the device data is processed to determine which end user network device 132 is associated with particular traffic (e.g., by data packet, by data set, etc.). In certain embodiments, the device data is further processed to determine (e.g., or at least guess) a device type to associate with each of the set of end user network devices 132.

Determining a device type may be accomplished in many different ways according to different embodiments of the invention. In one embodiment, protocols are parsed from the device data packets and analyzed to determine what type of device is being used. The protocol may indicate certain data handling capabilities of the respective end user network device 132. In another embodiment, manufacturer codes may be parsed from the MAC address associated with the device data to determine the manufacturer of the respective end user network device 132. In yet another embodiment, algorithms may detect data patterns (e.g., looking at the types of communications with a device, using neural network processing, etc.) that suggest certain device types. For example, if certain print commands are regularly sent, the network device may be a printer. Typically, multiple processing techniques may be used conjunctively to profile the devices on the subscriber network 130.

In some embodiments, the set of end user network devices 132 determined by the device data processing module 136 may be further processed to track the set of end user network devices 132 over time. This may reveal potentially important information, like now often a particular end user network device 132 appears to be active (e.g., does it appear to be always on the network, or only at certain times of day, etc.); whether a particular end user network device 132 should not be considered as part of the devices-by-user profile (e.g., the device was connected only for a limited time, and has not been connected for an amount of time since, suggesting that the user no longer has or uses the device); etc.

This and/or other information may be used by the device data processing module 136, the usage profile module 160, or any other module in the network environment 100 to generate the devices-by-user profile. It will be appreciated, however, that the "user" associated with the profile may indicate only a network identification. For example, the end user network devices 132 may be tracked in association with an identifier (e.g., the static/dynamic IP address, the MAC address, etc.) associated with the subscriber network access point 150. It may be desirable to further associate the "user" with one or more particular customers of the network service provider.

In some typical networks, like the network environment 100, a user (e.g., a network node, like the subscriber network access point 150) requests access to network services from a network service provider. In some embodiments, the requests are handled by an authentication, authorization, and accounting ("AAA") server. In one embodiment, the AAA server uses the Remote Authentication Dial-In User Service ("RADIUS") standard.

In some embodiments, the user data processing module 144 is in communication with the AAA server and/or other similar servers and systems. Through these user data sources, the user data processing module 144 may be able to associate a particular "user" with one or more particular subscribers, each having various types of associated subscriber information. For example, the user data processing module 144 may be able to associate a subscriber network access point 150 with a subscriber, for whom there may already be significant amounts of information, including name, address, billing information, etc.

In some embodiments, the subscriber information may further include preference information, like what types of content a subscriber prefers, whether the subscriber has subscribed to listserves or multicast streams, whether the subscriber has opted into or out of certain types of data collection or advertising, etc. In some embodiments, the preference and/or other subscriber information is generated by receiving the information from the subscriber through one or more user interfaces (e.g., a web portal). In other embodiments, the preference information is received from other sources, like companies that collect and sell subscriber information. In yet another embodiments, the subscriber information is generated by processing traffic to and/or from the subscriber.

It will be appreciated that there are many ways for the various modules to profile different types of information on the network. For example, various types of network probes, sniffers, inspection appliances, and other devices are known in the art. Some additional types of profiling systems and methods are described in U.S. patent application Ser. No. 12/234,801, filed Sep. 22, 2008, entitled "DYNAMIC MODEM BANDWIDTH CHECKING," which is hereby incorporated by reference in its entirety for all purposes.

Figure 2:
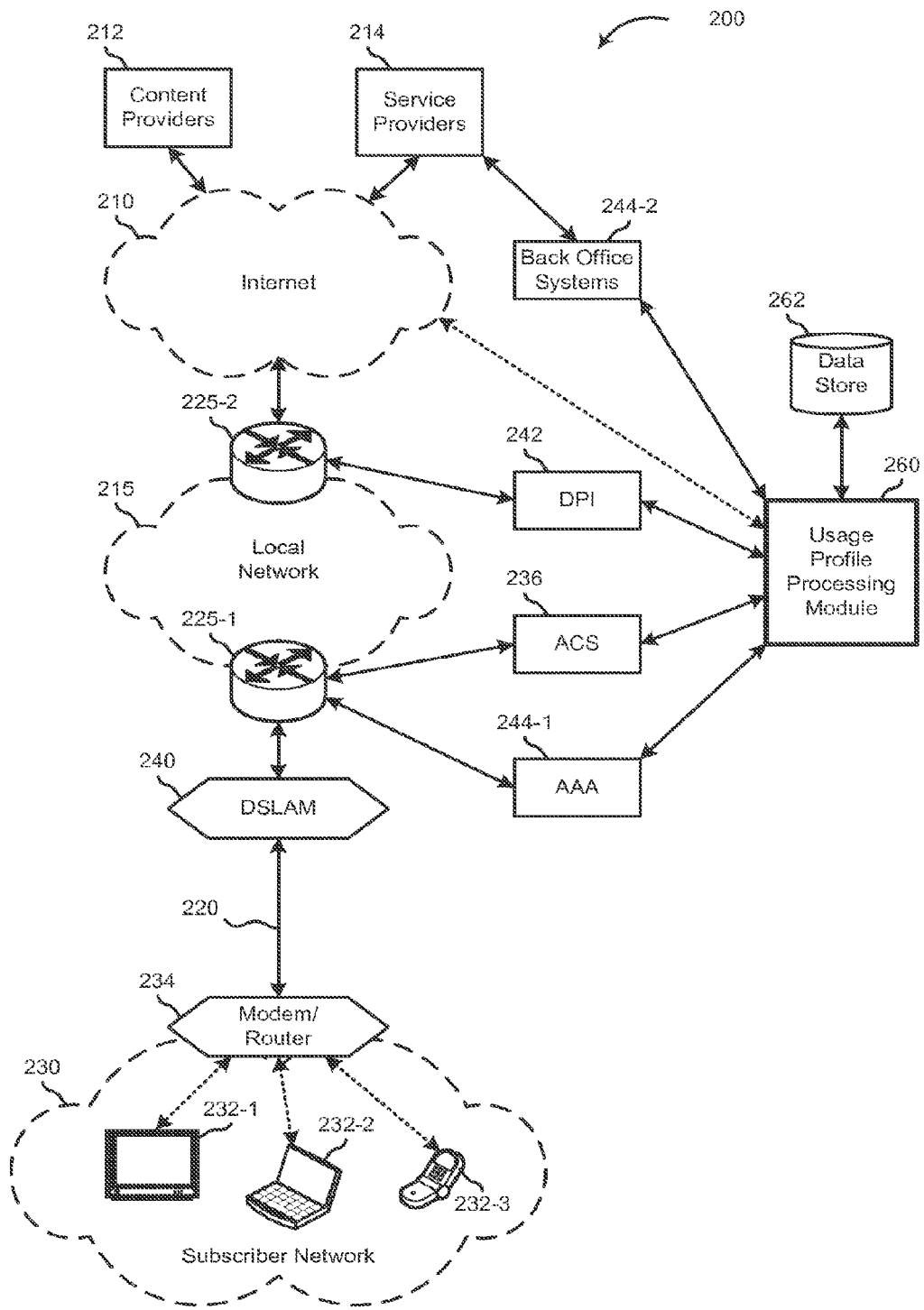
FIG. 2 shows a simplified diagram of one embodiment of a network environment for implementing functionality described with respect to FIG. 1, according to various embodiments of the invention.

It will be further appreciated that the various modules may generate, process, and communicate different types of data in different ways, and that many types of network arrangements are possible. FIG. 2 shows a simplified diagram of one embodiment of a network environment for implementing functionality described with respect to FIG. 1, according to various embodiments of the invention. The network environment 200 includes the Internet 210, a local network 215, an access network 220, and a subscriber network 230, each in communication over one or more routers 225 or other network elements.

These various networks work together to provide a communicative coupling between content providers 212 and service providers 214 at one end of the network environment 200, and end user network devices 232 (e.g., an IP-enabled television, a laptop computer, a WiFi-enabled cell phone, etc.) at the other end of the network environment 200. For example, the laptop computer 232-2 may communicate with a modem/router 234 (e.g., providing the functionality of both the device aggregator module 134 and the subscriber network access point 150 of FIG. 1). Data may then traverse the access network 220, entering a service provider's local network 215 through a DSLAM 240 and/or a router 225-1 (e.g., one or both acting like the provider network access point 140 of FIG. 1). The data may then pass from the local network 215 to the Internet 210 through another router 225-2.

Various modules may provide the functionality described with reference to the modules in FIG. 1, and may be in communication with the network environment 200 at various nodes. As illustrated, a DPI appliance 242 is provided in communication with the second router 225-2 to provide functionality similar to that of the network traffic processing module 142 in FIG. 1, an Automatic Configuration Server ("ACS") 236 is provided in communication with the first router 225-1 to provide functionality similar to that of the device data processing module 136 of FIG. 1; and a AAA server 244-1 and one or more back office systems 244-2 are provided in communication with the first router 225-1 to provide functionality similar to that of the user data processing module 144 of FIG. 1. Each of these modules (e.g., 236, 242, and 244) are in communication with a usage profile module 260, which may be configured to generate one or more usage profiles, as described herein.

In some embodiments, the usage profile module 260 is in communication with a data store 262 configured to store usage profile information, and/or other related information. In certain embodiments, some functionality of the usage profile module 260 is accessible via the Internet 210. For example, subscribers, content providers 212, service providers 214, etc. may be able to access (e.g., view, edit, process, etc.) certain usage profile information. In various embodiments, functionality may be accessible at different levels as a function of certain levels of entitlement (e.g., which may be purchased, earned, authorized, etc.).

Figure 3:
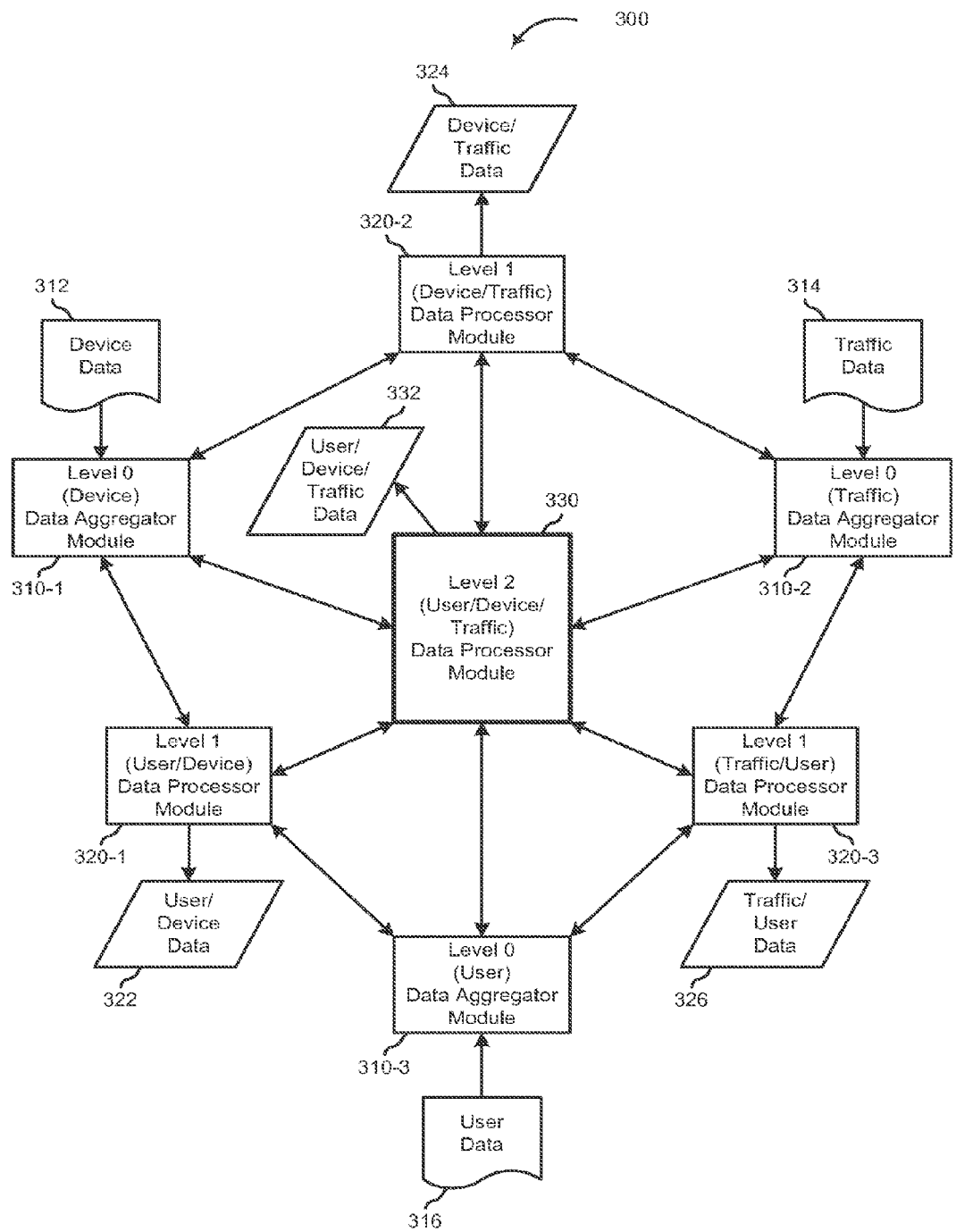
FIG. 3 shows a simplified data flow diagram, illustrating how different data may be used to generate different profiles, according to various embodiments of the invention.

By having access to various types of information from the various modules in the network environment 200, the usage profile module 260 may be able to generate a number of types of profiles, providing a number of different types of information. Some of these types of profiles and data are illustrated by FIG. 3. FIG. 3 shows a simplified data flow diagram, illustrating how different data may be used to generate different profiles, according to various embodiments of the invention.

For the sake of clarity, the various data is shown in the context of a generic network arrangement 300 having various modules that may be considered in tiers or levels. A module that aggregates and/or processes a single category of data may be considered a level-0 module 310, a module that processes data that has been processed by at least one level-0 module may be considered a level-1 module 320, a module that processes data that has been processed by at least one level-1 module may be considered a level-2 module 330, etc.

In some embodiments, a lowest level of data includes device data 312 (e.g., data traceable to a particular end-user network device, etc.), traffic data 314 (e.g., data traversing an access network), and user data 316 (e.g., subscriber information). As discussed above, the device data 312 may be processed by a first level-0 module 310-1 (e.g., the device data processing module 136 in FIG. 1), the traffic data 314 may be processed by a second level-0 module 310-2 (e.g., the network traffic processing module 142 in FIG. 1), and the user data 316 may be processed by a third level-0 module 310-3 (e.g., the user data processing module 144 in FIG. 1). Each of these level-0 modules 310 may process its respective data in one or more different ways (e.g., including aggregating, filtering, buffering, storing, associating, parsing, etc.). Each of the level-0 modules 310 may be in communication with one or more other level-0 modules 310 to provide level-1 functionality via a level-1 module 320. In some embodiments, the level-1 modules 320 are implemented as part of one or more of the level-0 modules 310. In other embodiments, the level-1 functionality is provided by separate level-1 modules 320 in communication with one or more of the level-0 modules 310.

A first level-1 module 320-1 processes device data 312 and user data 316 to generate user/device data 322. For example, user/device data 322 may include data useful for generating a devices-by-user profile. A second level-1 module 320-2 processes device data 312 and traffic data 314 to generate device/traffic data 324. For example, device/traffic data 324 may include data useful for generating a traffic-by-device profile. A third level-1 module 320-3 processes traffic data 314 and user data 316 to generate traffic/user data 326. For example, traffic/user data 326 may include data useful for generating a traffic-by-user profile. In some embodiments, a level-2 module 330 processes device data 312, traffic data 314, and user data 316 (e.g., or some combination of user/device data 322, device/traffic data 324, and traffic/user data 326) to generate user/device/traffic data 332. For example, user/device/traffic data 332 may include data useful for generating a traffic-by-device-by-user profile and/or another type of network usage profile.

These different types of profiles may be used in many different ways. For example, some or all of the different types of data and/or profiles may be used to provide traffic trending and patterning, network management, device and network security, targeted advertising, targeted service offering, service bundling, etc. The profile data may also be stored and/or further processed to provide these and additional types of information and functionality. It will be appreciated that, in some embodiments, different amounts and levels of data, data profiles, or analysis capabilities may also be licensed or sold (e.g., anonymously) to entities (e.g., advertisers, content providers, etc.) to provide various revenue streams.

In one example, a network service provider, named NSP, may purchase the right to query certain network usage profiles. The NSP may access and query traffic-by-user profiles to determine how many users use voice-over-Internet-protocol ("VoIP") services from competing network service providers. Advertisements may then be targeted to those users. Then, targeted ads may be sent to the users to encourage them to switch over to using NSP's VoIP services. For additional information (e.g., and potentially for additional cost), NSP may be able to retrieve the data in the form of traffic-by-customer profiles (e.g., by further aligning each user in the traffic-by-user profiles with customer information identifying those users).

In another example, NSP may wish to drill down to the device level by querying traffic-by-device-by-user profiles. Using this information, it may be possible to generate a report of the sites and/or services being used by each device for each user (e.g., or subscriber). For example, an entry in the report may indicate a user who watched the movie "Ocean's Thirteen" streamed over the Internet using a NetFlix application on May 8, 2008 at 7:00 pm. Further information may be retrievable in association with this record, like the movie viewing duration, network performance characteristics (e.g., bandwidth, error rate, etc.), whether the viewing matches the user's typical viewing habits, whether it indicates new device or application capability or access, information about the user's preferences, personal or billing information about the user, etc.

One illustrative report is shown as Report 1. Report 1 provides information about a user's network video traffic over the course of some time period. As illustrated, for User "J Smith," the report includes video devices used, sites most frequently visited using the device, peak average bandwidth usage, peak usage times, network errors per video session, etc. This information may indicate that targeting "New Music Videos" ads to the customer on Wednesday nights may be cost-effective for this customer, since the customer appears to have significant activity on iTunes at that time of the week. Alternatively, the report may indicate that display-based ads should not be targeted to all the user's devices, since the user apparently uses a VoIP phone and a webcam, neither of which may have display capability.

Report 1: Home Profile—User J Smith—Daily Report—Denver, Colo. May 8, 2008

| Video Device | Top Sites | Peak Usage Mbps | Peak Usage Day/Time | Network Errors/Session |
| --- | --- | --- | --- | --- |
| PC - Dell | Google, Amazon | 1,000 | Monday - 2 pm | 100 |
| VoIP Phone | Qwest VoIP | 200 | Sat - 7 pm | 500 |
| iPod - iTunes | Apple.com | 2,000 | Wed - 8 pm | 200 |
| Linksys WebCam | VideoChat.com | 500 | Tues - 10 am | 50 |
| xBox 360 | msn.live.com | 600 | Sat - 9 pm | 200 |

In yet another example, reports over many users may be generated. For example, on an hourly, daily, weekly, or other basis, reports may be generated to show how many users watched video content on the NSP network in Denver, Colo. The report of video sites over a time period may look like the illustrative report shown in Report 2.

Report 2: "Qwest Internet Video Usage for Denver, Colo. from Aug. 1, 2008 to Aug. 8, 2008

| Video Site | Movies Viewings | Peak Viewing | Viewing Devices | Network Errors/Movie |
| --- | --- | --- | --- | --- |
| NetFlix | 1000 | 7 pm | 1000 PC | 5 |
| Blockbuster | 500 | 8 pm | 500 PC | 3 |
| iTunes | 300 | 6 pm | 200 iPod, 100 PC | 4 |
| Google Video | 100 | 9 pm | 50 PDA, 50 PC | 6 |
| Hulu | 99 | 8 pm | 99 PC | 1 |

Report 2 shows some illustrative data that may be included in a report. Of course, a usage profile may include many additional or different types of information, and records in the report may be associated with that information. As illustrated in Report 1, usage profile data may be used to determine information, including which video sites are being visited by a set of customers, how many movies are viewed at those sites, when peak viewing times occur, what types of devices were used to view the information, average numbers of network errors per movie, etc.

Figure 4:
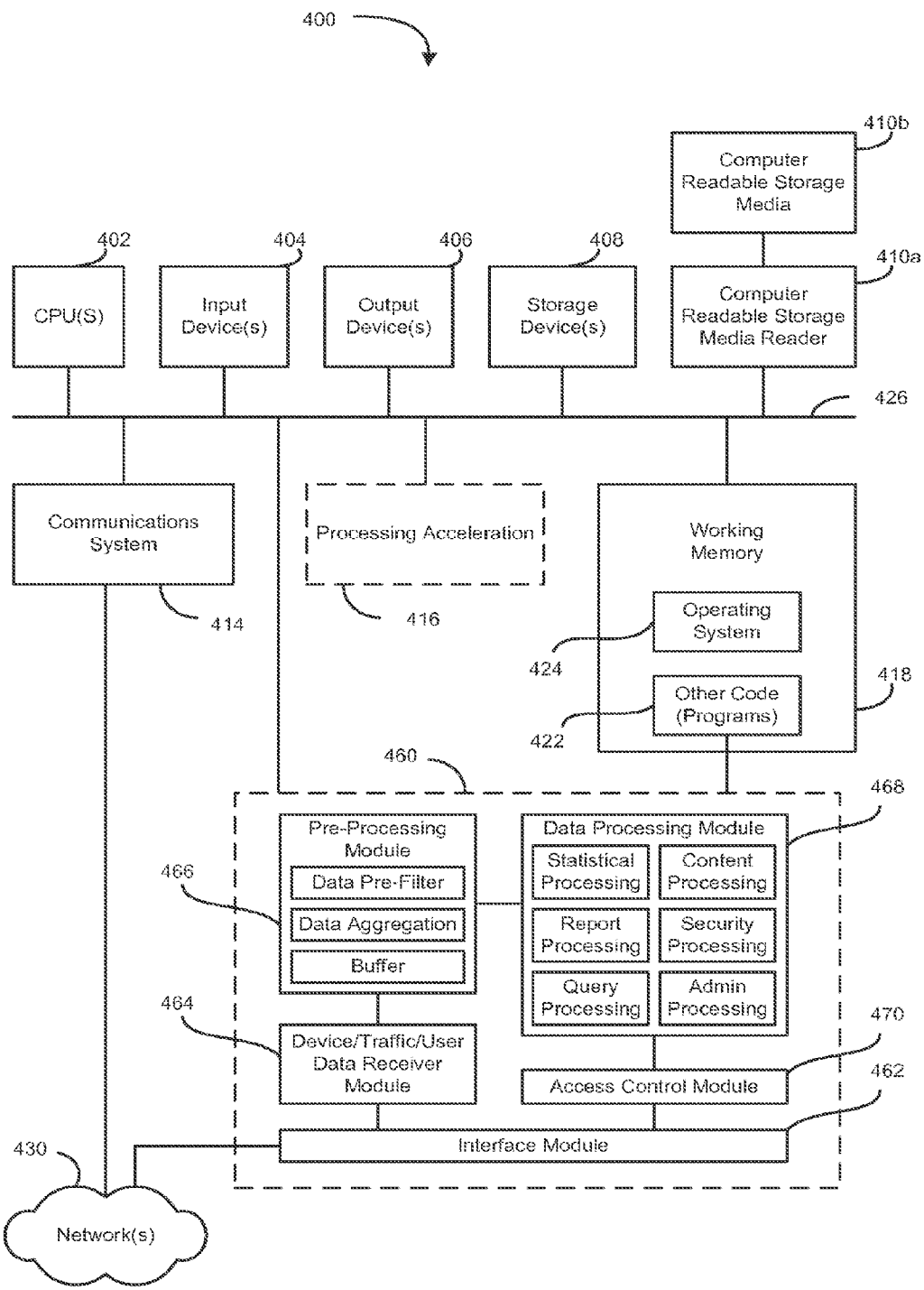
FIG. 4 shows an illustrative computational system for providing some or all of the functionality of a network usage profile module, according to various embodiments of the invention.

It will be appreciated that many other types of profiles, data, reports, functionality, etc. are possible, according to embodiments of the invention. Further, it will be appreciated that the functionality described with respect to any one module may be provided by, shared with, or divided among other modules. Even further, it will be appreciated that the functionality of the various modules may be implemented in many different ways without departing from the invention. FIG. 4 shows an illustrative computational system for providing some or all of the functionality of a network usage profile module, according to various embodiments of the invention.

The computational system 400 is shown having hardware elements that may be electrically coupled via a bus 426 (or may otherwise be in communication, as appropriate). The hardware elements may include one or more processors 402, including without limitation one or more general-purpose processors and/or one or more special-purpose processors (such as digital signal processing chips, graphics acceleration chips, and/or the like); one or more input devices 404, which can include without limitation a mouse, a keyboard, and/or the like; and one or more output devices 406, which can include without limitation a display device, a printer, and/or the like.

The computational system 400 may further include (and/or be in communication with) one or more storage devices 408, which can comprise, without limitation, local and/or network accessible storage and/or can include, without limitation, a disk drive, a drive array, an optical storage device, a solid-state storage device such as a random access memory ("RAM"), and/or a read-only memory ("ROM"), which can be programmable, flash-updateable, and/or the like. Embodiments of the storage devices 408 may include or provide functionality of a data storage module (e.g., data store 262 of FIG. 2).

The computational system 400 might also include a communications subsystem 414, which can include without limitation a modem, a network card (wireless or wired), an infra-red communication device, a wireless communication device and/or chipset (such as a Bluetooth device, an 802.11 device, a WiMAX device, cellular communication facilities, etc.), and/or the like. The communications subsystem 414 may permit data to be exchanged with one or more networks 430 (e.g., including the primary network 110, access network 120, or subscriber network 130 of FIG. 1, and/or any other networks or devices described herein). In many embodiments, the computational system 400 will further comprise a working memory 418, which can include a RAM or ROM device, as described above.

The computational system 400 also may include software elements, shown as being currently located within the working memory 418, including an operating system 424 and/or other code, such as one or more application programs 422, which may include computer programs of the invention, and/or may be designed to implement methods of the invention and/or configure systems of the invention, as described herein.

Merely by way of example, functionality of one or more systems, components, or procedures described herein might be implemented as code and/or instructions executable by a computer (and/or a processor within a computer). A set of these instructions and/or code might be stored on a computer readable storage medium 410b. In some embodiments, the computer readable storage medium 410b is the storage device(s) 408 described above. In other embodiments, the computer readable storage medium 410b might be incorporated within a computational system, such as the system 400. In still other embodiments, the computer readable storage medium 410b might be separate from the computational system (i.e., a removable medium, such as a compact disc, etc.), and/or provided in an installation package, such that the storage medium can be used to configure a general purpose computer with the instructions/code stored thereon. These instructions might take the form of executable code, which is executable by the computational system 400 and/or might take the form of source and/or installable code, which, upon compilation and/or installation on the computational system 400 (e.g., using any of a variety of generally available compilers, installation programs, compression/decompression utilities, etc.), then takes the form of executable code. In these embodiments, the computer readable storage medium 410b may be read by a computer readable storage media reader 410a.

In one embodiment, the invention employs the computational system to perform functionality of embodiments of the invention. According to a set of embodiments, some or all of the functions are performed by the computational system 400 in response to processor 402 executing one or more sequences of one or more instructions (which might be incorporated into the operating system 424 and/or other code, such as an application program 422) contained in the working memory 418. Such instructions may be read into the working memory 418 from another machine-readable medium, such as one or more of the storage device(s) 408 (or 410). Merely by way of example, execution of the sequences of instructions contained in the working memory 418 might cause the processor(s) 402 to perform one or more procedures of the methods described herein. In this way, the computational system 400 can be "configured to," "adapted to," or "operable to" perform any number of such procedures or methods.

It is worth noting that the terms "machine readable medium" and "computer readable medium," as used herein, refer to any medium that participates in providing data that causes a machine to operate in a specific fashion. In an embodiment implemented using the computational system 400, various machine-readable media might be involved in providing instructions/code to processor(s) 402 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical or magnetic disks, such as the storage device(s) (e.g., 408 or 410). Volatile media includes, without limitation, dynamic memory, such as the working memory 418. Transmission media includes coaxial cables, copper wire, and fiber optics, including the wires that comprise the bus 426, as well as the various components of the communication subsystem 414 (and/or the media by which the communications subsystem 414 provides communication with other devices). Hence, transmission media can also take the form of waves (including without limitation, radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punchcards, papertape, any other physical medium with patterns of holes, a RAM, a PROM, an EPROM, a FLASH-EPROM, any other memory chip or cartridge, a carrier wave as described hereinafter, or any other medium from which a computer can read instructions and/or code.

Various forms of machine-readable media may be involved in carrying one or more sequences of one or more instructions to the processor(s) 402 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computational system 400. These signals, which might be in the form of electromagnetic signals, acoustic signals, optical signals, and/or the like, are all examples of carrier waves on which instructions can be encoded, in accordance with various embodiments of the invention.

The communications subsystem 414 (and/or components thereof) generally may receive the signals, and the bus 426 then may carry the signals (and/or the data, instructions, etc. carried by the signals) to the working memory 418, from which the processor(s) 402 may retrieve and execute the instructions. The instructions received by the working memory 418 may optionally be stored on a storage device 408 either before or after execution by the processor(s) 402. Notably, in certain embodiments, the communication subsystem 414, input devices 404, output devices 406, and/or other components of the computational system 400 may be used to communicate with one or more other computational systems 400 (e.g., those other computational systems 400 providing increased or distributed functionality, like functionality of one or more other modules, like those shown in FIG. 3).

As such, it will be appreciated that all or some of the functions of the access-controlled subscriber network access point may be implemented as software or firmware components, dedicated hardware components, etc. For example, in one embodiment, the working memory 418 includes code 422 for executing functionality of an embodiment of a network usage profile module 460. In another embodiment, some or all of the functionality of the network usage profile module 460 may be implemented in dedicated or multi-purpose components that are in communication with the bus 426.

Embodiments of the network usage profile module 460 may include functionality that may be implemented in software routines, sub-modules, etc. In the embodiment illustrated, one non-limiting arrangement is shown for implementing functionality of the network usage profile module 460. The arrangement includes functional blocks, some or all of which can be implemented either as code (e.g., as part of or in communication with the code 422 implemented in working memory 418) or as sub-modules in communication with the bus 426.

In some embodiments, the network usage profile module 460 includes an interface module 462 in communication with the one or more networks 430. In certain embodiments, the interface module 462 is adapted to receive various types of data for generating network usage profiles. In other embodiments, the interface module 462 is adapted to receive requests (e.g., queries) for network usage profile information.

In certain embodiments, the interface module 462 is in communication with a data receiver module 464. The data receiver module 464 may be adapted to receive device data, network traffic data, user/customer data, or any other data useful for generating (or supporting the generation of) network usage profiles. Embodiments of the data receiver module 464 are further in communication with a data pre-processing module 466, which may provide various types of data pre-processing functionality. For example, the data pre-processing module 466 may pre-filter data (e.g., parse certain data from the flow of network traffic for more efficient processing), aggregate data (e.g., collect data from various access networks or network devices), buffer data (e.g., queue data to allow time for data pre-processing or other processing), etc.

In some embodiments, the data received at the data receiver module 464 and/or pre-processed at the data pre-processing module 466 may be passed to a data processing module 468. The data processing module 468 may provide many different types of data processing functions, including statistical processing (e.g., logging data over time, finding trends and patterns, interpolating or extrapolating data, making probabilistic determinations, etc.), content processing (e.g., matching and/or adapting content to data in the network usage profile module 460, assisting with targeting advertisements, etc.), query processing (e.g., interpreting query strings), report processing (e.g., formatting query results into useful reports), security processing (e.g., interpreting data received by the network usage profile module 460 to make security determinations, including encryption, usage outside contractual terms, attempts at unauthorized access, etc.), administrative processing (e.g., using data received by the network usage profile module 460 to make billing, network load balancing, and other administrative determinations, etc.), etc.

In some embodiments, access to the data processing module 468 (or information stored and/or processed by the data processing module 468) may be provided through an access control module 470. The access control module 470 may be in communication with the interface module 462, and adapted to control access to the network usage profile data. For example, parties requesting certain network usage profile information may have to log into a portal via a website. The access control module 470 may determine whether the requesting party is authorized to retrieve the requested information either prior to interpreting the request (e.g., the requesting party may be require to log in to determine even whether the party is authorized to make requests) and/or after receiving or interpreting the request (e.g., the authorization determination may be based on what kind of data is being requested.

In some embodiments, users and/or other parties may be able to set certain levels of authorization to certain types of network usage profile information. In one embodiment, a user can set preferences (e.g., through a web portal), indicating levels of access. For example, the user can set access right for specific entities (e.g., an employee's employer), for groups of entities (e.g., service providers vs. authorized content providers vs. unauthorized content providers, etc.), for types of data (e.g., personally identifying information, financial information, preference information, etc.), any combination of these, etc. Additionally, preferences may be set or determined as a function of different levels of payment (e.g., customers may pay extra to opt out of certain types of targeted content, content providers may pay extra to have privileged access to certain network usage profile information, etc.).

Each component of the network usage profile module 460 may be in communication with (or may include) one or more data stores. In some embodiments, the network usage profile module 460 is in communication with the data store(s) over the network(s) 430 (e.g., using cloud computing, networked servers, etc.). In other embodiments, the network usage profile module 460 is in communication with the data store(s) via the bus 426 (e.g., the data store(s) are included in or in communication with the storage device(s) 408, the computer readable storage media reader 410*a*, the computer readable storage media 410*b*, the output device(s) 406, etc.).

It will be appreciated that the functionality of the network usage profile module 460, and/or other components of the systems described in FIGS. 1-4 may be implemented in many other ways, according to embodiments of the invention. Further, many variations of the functionality are possible without regard for the specific system implementation of the functionality without departing from the scope of the invention. For example, some exemplary functionality of the various modules described herein, including the network usage profile module 460, will now be described with reference to the methods of FIGS. 5 and 6.

Figure 5:
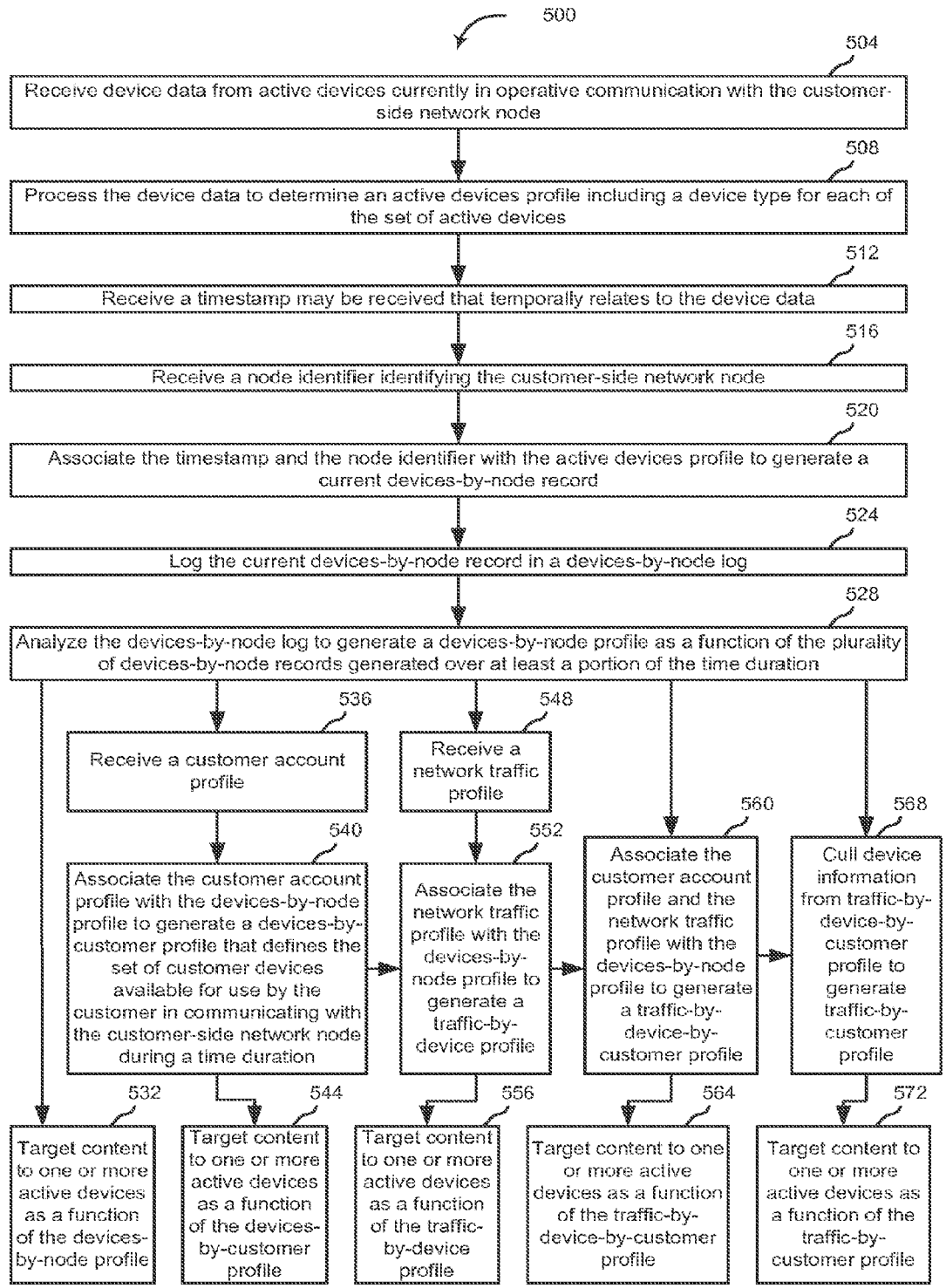
FIG. 5 shows a simplified flow diagram of an illustrative method for generating a network usage profile, according to various embodiments of the invention.

FIG. 5 shows a simplified flow diagram of an illustrative method for generating network usage profile information, according to various embodiments of the invention. Embodiments of the method 500 may at least operate to estimate (e.g., determine or guess) a set of customer devices available for use in communicating with a customer-side network node located at a customer side of an access network (e.g., the set of end user network devices described above). The set of customer devices may include a set of active devices, those devices currently in operative communication with the customer-side network node, and a set of inactive devices, those devices not currently in operative communication with the customer-side network node.

In some embodiments, the method 500 begins at block 504 by receiving device data from the set of active devices currently in operative communication with the customer-side network node. At block 508, the device data may be processed to determine an active devices profile including a device type for each of the set of active devices. For example, the method 500 may determine that a device is (or appears to be) a printer, a webcam, a personal computer, a personal digital assistant, etc. Additionally or alternatively, the method 500 may determine that a device has (or appears to have) capabilities for data processing, display, audio playback, etc.

At block 512, a timestamp may be received that temporally relates to the device data received in block 504. For example, the timestamp may indicate a time at which a data packet was sent, a duration of time during which a device appears to be actively communicating, or any other useful temporal information. A node identifier may also be received at block 516, identifying the customer-side network node. For example, the node identifier may indicate a static or dynamic address of a subscriber side network access point, a MAC address of a modem, or any other useful identifier for associating the device data received in block 504 to a network node.

At block 520, the timestamp received in block 512 and the node identifier received in block 516 may be associated with the active devices profile determined in block 508. This association may be used to generate a current devices-by-node record that defines the set of active devices (e.g., those devices currently in active communication with the customer-side network node identified by the node identifier at the time identified by the timestamp). In some embodiments, the current devices-by-node record generated in block 520 may be logged in a devices-by-node log at block 524. The devices-by-node log may be a data store (e.g., a server, a file, etc.) that includes a number of devices-by-node records generated over some time duration (e.g., an hour, a fiscal quarter, a billing cycle, an amount of communicated packets, etc.).

In certain embodiments, the devices-by-node log is analyzed at block 528 to generate a devices-by-node profile as a function of the plurality of devices-by-node records generated over at least a portion of the time duration. The devices-by-node profile may define at least an estimation of the set of customer devices available for use in communicating with the customer-side network node during the at least a portion of the time duration. For example, say a customer has five devices, which he uses at various times to communicate with the customer-side network node. At any given time, a devices-by-node record for that time may record device data from only a subset of those devices— those devices in active communication at that time. However, the devices by node log may indicate all five devices by detailing active device profiles over a period of time.

In some embodiments, at block 532, content is targeted to one or more active devices as a function of the devices-by-node profile. In certain embodiments, the content is specifically targeted (e.g., directed and/or adapted) to a characteristic of the particular active devices. In one example, the content may be targeted to a device because the device tends to be active at a desired time of day (e.g., the user's IP-enabled television is active during prime time and an advertiser wants to target an advertisement for a prime-time television show; grocery coupons are targeted to a user's IP-enabled refrigerator, which is almost always in communication with the customer's home network; etc.). In another example, the content is targeted based on a particular capability of the device (e.g., low-resolution content is targeted to a device having a low resolution screen; display advertisements are not sent to webcams, printers, and other devices not having a display; etc.).

In some embodiments, the method 500 further receives a customer account profile at block 536. The customer account profile may include account information relating to a customer associated with the customer-side network node. The customer account profile may be associated in block 540 with the devices-by-node profile generated in block 528 to generate a devices-by-customer profile that defines the set of customer devices available for use by the customer in communicating with the customer-side network node during the at least a portion of the time duration.

In certain embodiments, at block 544, content is targeted to one or more active devices as a function of the devices-by-customer profile. Certain account information may indicate that the customer is entitled to receive certain content. For example, the customer may login or pay extra to receive certain programming; may opt-in to, opt-out of, or subscribe to certain content streams or advertisements; etc. In various embodiments, the account information is received using an authorization system. For example, the account information may be received by a AAA server, a RADIUS system, etc.

In some embodiments, the method 500 further receives a network traffic profile at block 548. The network traffic profile may include traffic information relating to network traffic being communicated over at least a portion of the access network. The traffic information may include raw data traversing the network or pre-processed data (e.g., pre-filtered data). In block 552, the network traffic profile may be associated with the devices-by-node profile to generate a traffic-by-device profile. The traffic-by-device profile may define at least a portion of the network traffic attributable to at least a portion of the set of active devices during some time duration. In certain embodiments, the network traffic profile includes a network characteristic defining a traffic-related characteristic of the access network (e.g., nominal and/or measured bandwidth, throughput, error rate, etc.).

In certain embodiments, at block 556, content is targeted to one or more active devices as a function of the traffic-by-device profile. In one embodiment, network load balancing is affected per customer to balance network load requirements while accounting for customer relationships (e.g., fair access policies, minimum bandwidth guarantees, customer preferences, etc.). In another embodiment, content may be directed to specific users in specific ways (e.g., by changing protocols, encryption, data rates, etc.) as a function of the bandwidth, error rates, etc. of a customer's network.

In some embodiments, at block 560, the customer account profile received in block 536 and the network traffic profile received in block 548 are associated with the devices-by-node profile generated in block 528 to generate a traffic-by-device-by-customer profile. The traffic-by-device-by-customer profile may define at least a portion of the network traffic attributable to at least a portion of the set of customer devices available for use by the customer in communicating with the customer-side network node during a time duration.

In certain embodiments, at block 564, content is targeted to one or more active devices as a function of the traffic-by-device-by-customer profile. For example, the traffic-by-device-by-customer profile may indicate that, for particular content, the customer is entitled to receive the content according to the account information, one of the customer's active devices is capable of handling the content according to a set of data handling capabilities defined by the devices-by-node profile, and the customer's access network is capable of handling the content according to the network traffic profile.

In some embodiments, at block 568, device information is culled from the traffic-by-device-by-customer profile to generate a traffic-by-customer profile. The traffic-by-customer profile may define at least a portion of the network traffic attributable to the customer associated with the customer-side network node during a time duration. In certain embodiments, at block 572, content is targeted to one or more active devices as a function of the traffic-by-customer profile.

Figure 6:
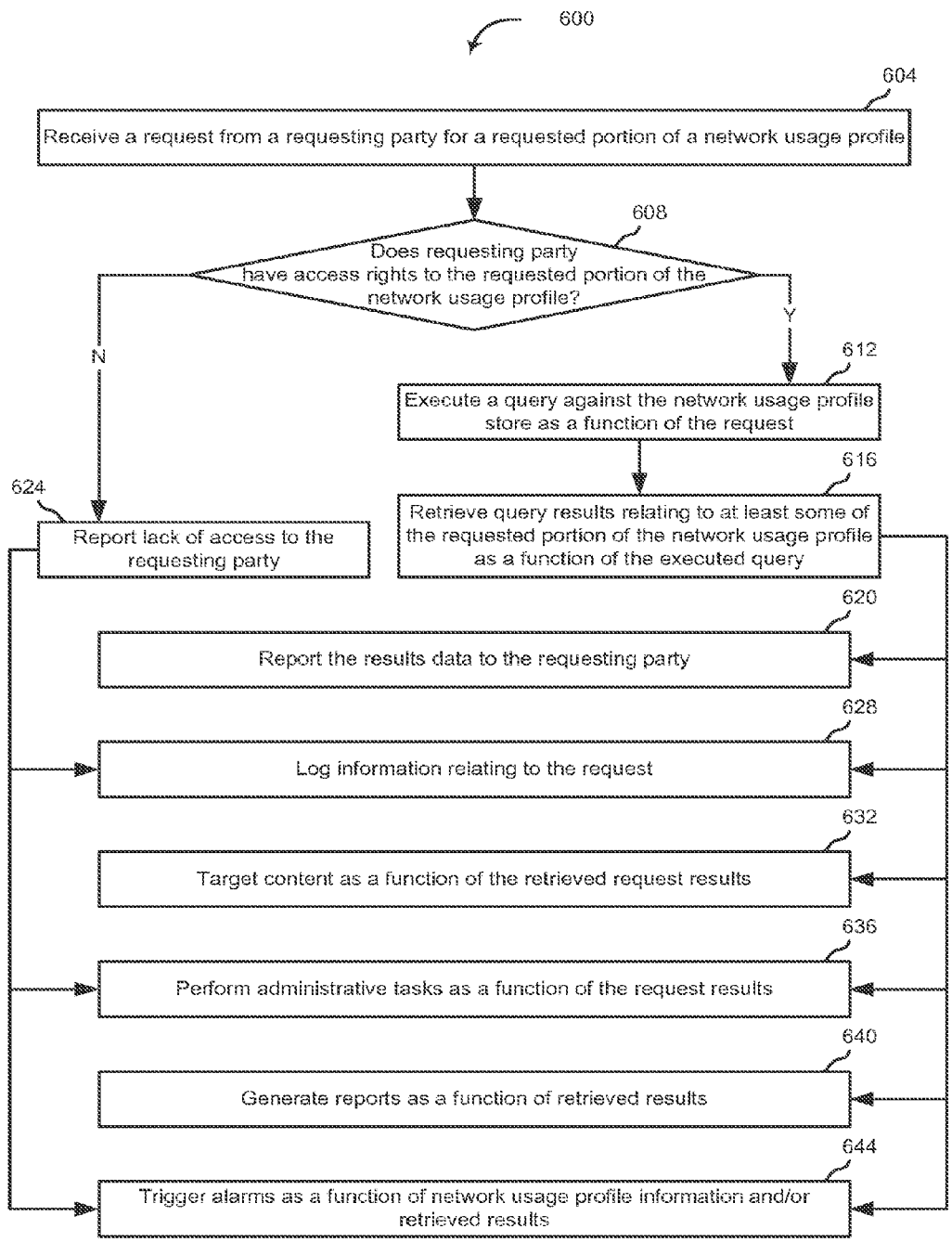
FIG. 6 shows a simplified flow diagram of an illustrative method for providing access to network usage profile information, including the various types of profiles generated by the method of FIG. 5, according to various embodiments of the invention.

It will be appreciated that much of the value of generating various network usage profile data (e.g., using the method 500 of FIG. 5), may arise from providing access to the information. FIG. 6 shows a simplified flow diagram of an illustrative method for providing access to network usage profile information, including the various types of profiles generated by the method 500 of FIG. 5, according to various embodiments of the invention. Some embodiments of the method 600 may be performed using any of the systems described in FIGS. 1-4.

In some embodiments, the method 600 begins at block 604 by receiving a request from a requesting party for a requested portion of a network usage profile. For example, the network usage profile may be one of many network usage profiles stored in a network usage profile store. At block 608, the method 600 may determine whether the requesting party has access rights to the requested portion of the network usage profile. In one embodiment, the requesting party logs into a web portal to query network access profile information. In another embodiment, the requesting party maintains some other type of entitlement relationship (e.g., has internal access to a server, maintains certain encryption keys, etc.).

At block 612, after determining in block 608 that the requesting party has access rights to the requested portion of the network usage profile, the method 600 may execute a query against the network usage profile store as a function of the request. The query results may be retrieved at block 616, the results relating to at least some of the requested portion of the network usage profile as a function of the executed query. At block 620, the results data may be reported to the requesting party.

In certain embodiments, at block 624, if it is determined in block 608 that the requesting party does not have access rights to the requested portion of the network usage profile, the method 600 may report the lack of access to the requesting party. In certain other embodiments, at block 628, information relating to the request may be logged. For example, the query string, requesting party, results data, failed authorization, or any other information may be logged and/or used to affect further operation of the method 600.

In some embodiments of the method 600, additional steps may be performed as a function of network usage profile information, including retrieved results. In one embodiment, at block 632, content may be targeted (e.g., to an active device) as a function of the retrieved request results. In another embodiment, at block 636, administrative tasks (e.g., tracking, billing, network load balancing, security, etc.) may be performed as a function of the request results (e.g., where the requesting party in a network service provider). In yet another embodiment, in block 640, periodic, automatic, and/or other types of reporting may be generated as a function of retrieved results. For example, monthly usage reports may be generated for each customer of network services. In still another embodiment, in block 644, alarms may be triggered by network usage as a function of network usage profile information and/or retrieved results. For example, network usage outside some pattern of usage or some contractually-established usage restriction may trigger a system alarm. The alarm may indicate the triggered condition to any entity, including users, content providers, service providers, etc.

It will be apparent to those skilled in the art that substantial variations may be made in accordance with specific requirements to all of the systems, methods, software, and other embodiments described above. For example, customized hardware might also be used, and/or particular elements might be implemented in hardware, software (including portable software, such as applets, etc.), or both. Further, connection to other computing devices such as network input/output devices may be employed.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added, and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of monitoring network traffic of a subscriber of an Internet Service Provider (ISP), the method comprising:
routing, with a device aggregator located in a subscriber premise network, traffic between a plurality of end user network devices in the subscriber premise network and an access network of the ISP, wherein the device aggregator is integrated with a subscriber network access point, which provides connectivity between the subscriber premise network and the access network of the ISP;

examining, with the device aggregator, network traffic between one or more of the plurality of end user devices and the access network, wherein examining traffic between one or more of the plurality of end user devices and the network comprises examining network traffic destined for the one or more end user devices;

identifying a user associated with at least one device of the one or more devices;

generating a traffic profile for each of the one or more of the plurality of end user devices, based on examination of the network traffic;

based on the traffic profile of each of the one or more of the plurality of end user devices, determining a device type of each of the one or more of the plurality of end user devices; and managing, with the device aggregator, network traffic between the one or more of the plurality of end user devices and the access network, based at least in part on the traffic profiles of each of the one or more of the plurality of end user devices.

2. The method of claim 1, wherein the device aggregator comprises a wireless access point.

3. The method of claim 1, wherein the subscriber network access point comprises a broadband modem.

4. The method of claim 1, wherein the plurality of end user network devices comprises one or more laptop or desktop computers, one or more personal digital assistants or cell phones, one or more printers, and one or more additional end user devices.

5. The method of claim 1, wherein examining traffic between one or more of the plurality of end user devices and the network comprises examining network traffic originating from the one or more end user devices.

6. The method of claim 1, further comprising:
determining one or more user preferences of the user, based on examination of network traffic between the at least one device and the access network, wherein managing network traffic comprises managing the network traffic based at least in part on the user preferences.

7. The method of claim 1, wherein managing network traffic comprises limiting bandwidth available to at least some of the network traffic, based at least in part on one or more device profiles.

8. The method of claim 1, wherein managing network traffic comprises targeting a specific set of network traffic received at the device aggregator to a specific end user device, based at least in part on a device type of the specific device.

9. The method of claim 8, wherein the specific set of network traffic comprises multimedia content.

10. The method of claim 8, wherein the specific set of network traffic is targeted based at least in part on device capabilities of the specific end user device.

11. The method of claim 8, wherein the specific set of network traffic is targeted based at least in part on an identity of a user of the specific end user device.

12. The method of claim 8, wherein the specific set of network traffic is targeted based at least in part on a status of the specific end user device as active.

13. The method of claim 1, further comprising collecting, at the device aggregator, network performance information associated with the network traffic between the one or more of the plurality of end user devices and the access network.

14. A device aggregator located in a subscriber premise network, the device aggregator comprising:
a processor; and
a non-transitory computer readable medium having encoded thereon instructions executable by the processor to:
route traffic between a plurality of end user network devices in the subscriber premise network and an access network of the ISP;
examiner, with the device aggregator, network traffic between one or more of the plurality of end user devices and the access network, wherein examining traffic between one or more of the plurality of end user devices and the network comprises examining network traffic destined for the one or more end user devices;
identify a user associated with at least one device of the one or more devices;
generate a traffic profile for each of the one or more of the plurality of end user devices, based on examination of the network traffic;
based on the traffic profile of each of the one or more of the plurality of end user devices, determine a device type of each of the one or more of the plurality of end user devices; and
manage network traffic between the one or more of the plurality of end user devices and the access network, based at least in part on the traffic profiles of each of the one or more of the plurality of end user devices;
wherein the device aggregator is integrated with a subscriber network access point, which provides connectivity between the subscriber premise network and the access network of the ISP.

15. The device aggregator of claim 14, wherein the device aggregator is integrated within a wireless access point.

16. The device aggregator of claim 14, wherein the subscriber network access point comprises a broadband modem.

17. The device aggregator of claim 14, wherein managing network traffic comprises targeting a specific set of network traffic received at the device aggregator to a specific end user device, based at least in part on a device type of the specific device.

18. The device aggregator of claim 17, wherein the specific set of network traffic is targeted based at least in part on device capabilities of the specific end user device.

* * * * *